US007064760B2

(12) United States Patent
Capin et al.

(10) Patent No.: US 7,064,760 B2
(45) Date of Patent: Jun. 20, 2006

(54) METHOD AND APPARATUS FOR EXTENDING STRUCTURED CONTENT TO SUPPORT STREAMING

(75) Inventors: Tolga K. Capin, Fort Worth, TX (US); Selim S. Balcisoy, Fort Worth, TX (US)

(73) Assignee: Nokia Corporation, Espoo (FI)

( * ) Notice: Subject to any disclaimer, the term of this patent is extended or adjusted under 35 U.S.C. 154(b) by 336 days.

(21) Appl. No.: 10/175,641

(22) Filed: Jun. 19, 2002

(65) Prior Publication Data
US 2004/0004619 A1 Jan. 8, 2004

(51) Int. Cl.
*G06T 15/70* (2006.01)
(52) U.S. Cl. .................... 345/473; 345/419; 345/423; 345/474; 345/475; 345/581; 707/3
(58) Field of Classification Search ............... 345/419, 345/581, 473, 474, 475, 423; 707/3
See application file for complete search history.

(56) References Cited

U.S. PATENT DOCUMENTS

| 6,057,854 A | | 5/2000 | Davis, Jr. et al. ............ 345/433 |
| 6,584,459 B1 | * | 6/2003 | Chang et al. .................. 707/3 |
| 6,704,024 B1 | * | 3/2004 | Robotham et al. .......... 345/581 |
| 6,741,242 B1 | * | 5/2004 | Itoh et al. .................... 345/419 |
| 6,785,673 B1 | * | 8/2004 | Fernandez et al. ............. 707/3 |

FOREIGN PATENT DOCUMENTS

| WO | WO-01/26373 A2 | 4/2001 |
| WO | WO-01/31497 A | 5/2001 |
| WO | WO-02/076058 A | 9/2002 |

OTHER PUBLICATIONS

Girardot, Marc et al., "Efficient Representation And Streaming Of XML Content Over The Internet Medium", Jul. 30, 2000, pp. 67-70.
Duce, D. et al., "WEB 2D Graphics File Formats", Computer Graphics Forum, Amsterdam, NL, vol. 21, No. 1, Mar. 2002, pp. 43-64.
Buendia, F. et al., "XEDU, a Framework for Developing XML-based Didactic Resources", IEEE 2001, pp. 427-434.

* cited by examiner

*Primary Examiner*—Kimbinh T. Nguyen
(74) *Attorney, Agent, or Firm*—Harrington & Smith, LLP (57) ABSTRACT

A method and apparatus is disclosed for sending structured data from a transmitter (1) to a receiver (3) through a network environment (2). The method includes partitioning the structured data into at least one scene by inserting scene delimiter statements, where each scene includes at least one object. Within a scene the method includes opening a stream by inserting a first stream delimiter command, and within the stream, using at least one of an object addition, deletion and modification command. The open stream is closed by inserting a second stream delimiter command. The resulting structured data is transmitted through the network environment, such as through an RF link between a wireless system network operator (5) and a mobile station (100).

28 Claims, 7 Drawing Sheets

METHOD AND APPARATUS FOR EXTENDING STRUCTURED CONTENT TO SUPPORT STREAMING

TECHNICAL FIELD

The teachings of this invention relate generally to data transmission protocols and formats and, more specifically, relate to extensions for arbitrarily structured data to enable streaming in low-bandwidth and other environments.

BACKGROUND

Information is typically represented using a structured description. Structured data includes content such as databases, spreadsheets, address books, configuration parameters, financial transactions and technical drawings. The Extensible Markup Language, or XML, is a standard text-based representation of structured data on the World Wide Web, and has become the most popular format to represent structured data. An example XML content is as follows:

```
<person>
    <name>John Smith</name>
    <street>24 Main Street</street>
    <city>Old Town</city>
    <state>TX</state>
    <zip>75039</zip>
</person>
```

One particular application of XML is for representing vector graphics data. Vector graphics describes two-dimensional graphics, and allows for three types of graphic objects: vector graphic shapes (e.g., paths consisting of straight lines and curves), images and text. Graphical objects can be grouped, styled, transformed and composited into previously rendered objects. Vector graphics drawings can be dynamic and interactive.

One organization (W3C) has defined a standard vector graphics language in XML, referred to as the Scalable Vector Graphics or SVG, W3C Consortium, Scalable Vector Graphics Specification, WWW Candidate Recommendation, 2000.

An example of structured SVG content for representing vector graphics data is as follows:

```
<svg width="5cm" height="5cm"
     xmlns="http://www.w3.org/2000/svg">
    <desc>A group with two rectangles
    </desc>
    <g id="group1" fill="red">
        <rect x="1cm" y="1cm" width="1cm" height="1cm"/>
        <rect x="3cm" y="1cm" width="1cm" height="1cm"/>
    </g>
</svg>
```

XML was designed to be useful in the World Wide Web environment and assumes that sufficient bandwidth exists. However, relatively low-bandwidth communications (e.g., mobile communication applications) require a form of incremental representation, to decrease latency of a user agent's processing of the data, and to decrease memory requirements. Streaming, or substantially continuous data transmission, is crucial for most applications that require the delivery of large content, e.g., a large cartoon animation represented using XML.

Prior to this invention problems have existed in converting formatted data to a form that can be streamed with minimal change to the original content. In addition, problems existed in excessive bandwidth and storage requirements for transmitting and processing large structured content.

Prior attempts to address these problems include the following.

The streaming of non-structured video and audio data over various data networks is the intent of a set of standards and products (e.g., MPEG-4 and RealNetworks™). For example, audio/video players are usually designed to begin playing received content from the Internet without requiring one to first download the entire file.

Another approach, Macromedia Flash™ (www.macromedia.com), presents an approach for the streaming of vector graphics content as binary data. Flash™ defines a "display list" method consisting of a set of commands for each frame, and may thus be viewed as an alternative to the structured representation of graphics content.

U.S. Pat. No. 6,057,854, "System and method of providing interactive vector graphics over a network", John Davis, Jr. And Scott M. Glazer, discloses a client-server based system where an interactive vector object that is downloadable over a network includes a vector object and an active area defined by the vector object. A vector graphics network file, in connection with the data, renders the image of the vector object on a client system that is connectable to the network.

Another approach, MPEG-7 BiM (Binary format for MPEG-7 ISO/IEC 15938-1), is a binary format for the compression and streaming of XML Documents. MPEG-7 BiM is based on dividing a large XML document into pieces and delivering them separately to the client. BiM defines a compression method, and does not consider how to extend the structure content to allow streaming.

A method for streaming XML data is presented in WO 01/26373 A2, "Method and Apparatus for Streaming XML Content", Raymond J. Krasinski. Each XML document is decomposed and encoded as a collection of sub-trees. Each sub-tree from the larger XML document tree can be parsed and validated by the XML receiver as if it is and independent tree. The structure node indicates the relationship of the sub-tree to other sub-trees, thereby allowing the XML receiver to reconstruct the full tree.

A method for transferring data that is somewhat analogous to streaming is the HTML Push/Pull technology. In a Server Push operation the server sends down a packet of data and the browser displays the data but leaves the connection open. Whenever the server desires it sends more data and the browser displays the data, still leaving the connection open. In a Client Pull operation the server sends down a block of data, including a directive (in the HTTP response or the document header) that specifies "reload this data in x seconds", or "go load another URL in y seconds". After the specified amount of time has elapsed, the client performs the directed operation, either reloading the current data or retrieving new data.

In the Server Push operation the HTTP connection is held open for an indefinite period of time (until the server knows it is done sending data to the client and sends a terminator, or until the client interrupts the connection). In the Client Pull operation the HTTP connections are never held open; rather, the client is instructed when to open a new connection, and what data to fetch when it does so.

The Synchronized Multimedia Integration Language (SMIL) (http://www.w3.org/TR/smil20/) enables the simple authoring of interactive audiovisual presentations. SMIL is typically used for multimedia presentations that integrate streaming audio and video with images, text or any other media type.

None of these prior art approaches has been found to adequately solve the problem providing structured data in a form that allows streaming in low bandwidth and other environments.

SUMMARY OF THE PREFERRED EMBODIMENTS

The foregoing and other problems are overcome, and other advantages are realized, in accordance with the presently preferred embodiments of these teachings.

This invention provides a method for the extension of arbitrary structured data to support streaming. A presently preferred embodiment of the method, and of apparatus that implements the method, splits or partitions the content into a set of scenes that are capable of being represented and processed independently of each other (e.g., scenes in a cartoon animation). Each scene contains a list of objects (e.g., cartoon characters, background). The objects are considered to be atomic (non-partitionable) units that combine content and that can be processed collectively. The method further defines addition, deletion and modification commands that operate on the objects during streaming.

The invention provides a means to convert any arbitrarily structured data to a streamable form by extending and reorganizing the structure of the data. There are a number of advantages that are realized by the practice of the teachings of this invention, as compared to the other known alternatives.

A first advantage is that the decoder in the data receiver is not required to have the complete data structure to process it, as each scene element is self-contained for representation.

A second advantage is that arbitrary objects can be added or deleted to the data structure at any time.

A further advantage is that the method of this invention supports multiple name spaces, as it is a namespace independent extension of the document.

A method is disclosed for sending structured data from a transmitter to a receiver through a network environment. The method comprises partitioning the structured data into at least one scene by inserting scene delimiter statements, where each scene includes at least one object; within a scene, opening a stream by inserting a first stream delimiter command; within the stream, using at least one of an object addition, deletion and modification command; within the scene, closing the open stream by inserting a second stream delimiter command; and transmitting the resulting structured data through the network environment.

A scene includes an attribute that specifies a total duration of the scene, and overrides a total scene duration determined from elements that comprise the scene. A plurality of scenes cover mutually exclusive time intervals, and a union of the time intervals forms a continuous time interval.

The object addition command references an object in a current graphics tree, and includes attributes of anchor, relation and time. The anchor attribute is a reference to an ID of an object in the current graphics tree and, with the relation attribute, specifies where in the current graphics tree an associated object should be inserted, and the time attribute specifies the time when the object insertion is to be performed.

The object deletion command references an object in a current graphics tree, and includes attributes of anchor and time. The anchor attribute is a reference to an ID of an object in the current graphics tree that is to be removed from the current graphics tree, and the time attribute specifies the time when the object removal is to be performed.

The object modification command includes a refresh time interval when the associated object is to be updated with a new object downloaded from a link refresh network address.

The structured data may be Extensible Markup Language (XML) data, which in turn may comprise Scalable Graphics Format SVG data.

In the presently preferred embodiment, the network environment includes a wireless link, such as an RF link between a network operator and a mobile station. In this case the data receiver can comprise the mobile station with a display for displaying a result of processing of the partitioned structured data received by the mobile station receiver.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIGS. 2A and 2B, collectively referred to as FIG. 2, illustrate a reorganization of structured data for streaming, where

FIG. 5A illustrates an example of a streamed time-based animation, while

DETAILED DESCRIPTION OF THE PREFERRED EMBODIMENTS

Figure 1:
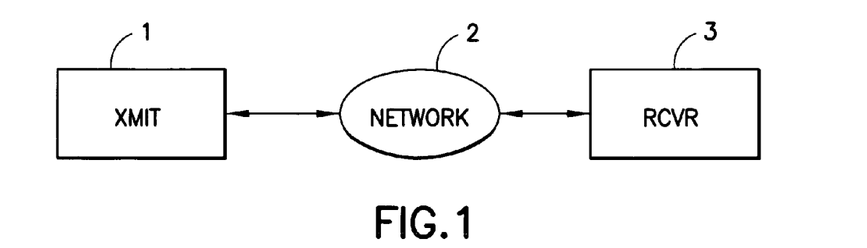
FIG. 1 is a simplified diagram of a technical environment of this invention.

By way of introduction, and referring to FIG. 1, the method in accordance with this invention can be summarized as providing enhancements to an existing structured content to support streamed content delivery and representation from a data transmitter 1 through a network environment 2 to a data receiver 3.

The approach is as follows. A first step defines an XML namespace, which supports streamable components as well as formatted objects. This name space is utilized to organize the objects in a structured manner. The distinct elements and attributes have the following scope hierarchy and, for the sake of illustration, define a namespace sml (Stream Modeling Language) as follows:

```
<sml:sml>
    <sml:scene>
        <sml:stream>
            <sml:deleteObject>
            <sml:addObject>
```

Turning first to the definition and attributes of a scene, a sml document in accordance with this invention includes one or more scenes, with each scene covering mutually exclusive time intervals. The union of the time intervals (scenes) comprises a continuous time interval.

Preferably, each scene contains one self-contained object. Each such object is defined to be associated with zero or one stream object. A 'scene' has one attribute: 'dur'. This attribute specifies the total duration of the scene, and overrides (clips) the total duration determined by the elements within the scene. If the 'dur' attribute is not present the scene is static and continuously present.

Turning now to the definition and attributes of 'stream', a scene object can contain one or more stream objects. A stream object contains at least one object that performs an add, a delete or a refresh operation. Each stream content is transmitted to the receiver 3, after the termination of an initial transmission of the static content of the sml document, in-line with time values defined in addObject, deleteObject elements and refresh attributes (defined below). A stream object has no attributes.

With regard to the definition and attributes of a deleteObject command, the deleteObject command is referenced to an existing graphics object. The deleteObject command has two required attributes: target and time. The target attribute is a reference to the identification (ID) of an object to be deleted, and the time attribute is the time when the object deletion operation is to be performed. The time attributes of consecutive deleteObject (and addObject) commands are defined to make a non-decreasing sequence.

With regard to the definition and attributes of an addObject command, the addObject command may reference any object within the graphics format scope, with a reference to an existing graphics tree. The addObject command has three required attributes: anchor, relation and time.

The anchor attribute is a reference to the ID of an object in the current graphics tree. Together with the relation attribute, the anchor attribute specifies where in the graphics tree the object(s) to be declared should be inserted. The possible values of relation are (a) child, (b) prevSibling and nextSibling. The time attribute is the time when the object insertion is to be performed.

For example, if there is a group object in the graphics tree with an ID of "group1", the following command adds a rectangle as the last child of this group at time=5 seconds:

```
<addObject time="5s" anchor="group 1" relation="child">
  <rectangle x="0" y="5" width="5" height="10"/>
</addObject>
```

As was stated above, the time attributes of consecutive addObject and deleteObject commands should form a non-decreasing sequence.

With regard now to Refresh Attributes, a refreshRate is the time interval when the object should be updated with a new object downloaded from a link refreshURL, and can be added to all xlink:href elements in any namespace.

This invention can be implemented by extending existing structured data. For illustration purposes, a non-limiting example is shown below of how the Scalable Graphics Format (SVG) is extended for including the case of a streaming animation.

```
<sml>
  <scene>
```

-continued

```
    <svg id="main" height="100" width="100">
      <g id="g1">
        <path fill="red" d=
        "M10 10 L 100 10 100 50 10 50z"/>
        <animateTransform attributeName="transform"
        type="scale"
            dur="0.8s"   from= ".7"   to="1.1"
repeatCount="indefinite"/>
      </g>
    </svg>
*********** <stream>
      <addObject time="5s" anchor="g1" relation=
      "nextSibling">
        <g id="g2">
          <rect fill="blue" x="10" y="15" width="10"
          height="10"/>
          <animateTransform attributeName="transform"
          type="translate"
          dur="15s" from="0" to="80" repeatCount=
          "indefinite"/>
        </g>
      </addObject>
      <deleteObject time="15s" target="g1">
      <addObject time="1s" anchor="g1" relation="child"
      refreshRate="1s"
      refreshURL=www.example.foo/stockupdate.svg>>
      </addObject>
*********** </stream>
  </scene>
  <scene dur="25">
    <svg>
      <ellipse cx="30" cy="30" rx="10" ry="20"/>
    </svg>
  </scene>
</sml>
```

The first <scene> statement opens a scene, and the following <svg> code is downloaded to the data receiver 3 in order to setup and begin the animation. In accordance with an aspect of this invention the statements and commands between the two <stream> statements (marked with asterisks) mark a stream, where the first <stream> statement opens the stream and the second <stream> statement closes the stream. In between are addObject and deleteObject commands in accordance with this invention, where one of the addObject commands adds an object obtained and refreshed from a network address, in this example the URL www.example.foo/stockupdate.svg. The second <scene> statement closes the first scene. The second scene, where an ellipse is added to the displayed animation, does not include a stream.

Note in this example how the <scene> statements are used to partition the structured SVG data into independent scenes, where each scene contains a list of objects used to combine content and that can be processed collectively. Note as well the object addition, deletion and modification commands that operate on objects during streaming.

Figure 2A:
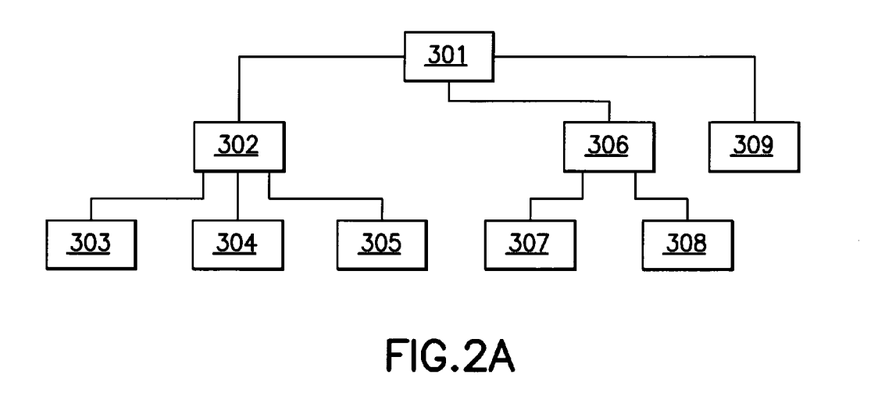
FIG. 2A shows a directed graph representation of structured data and FIG. 2B shows the effect of adding the streaming extensions in accordance with this invention.
Figure 2B:
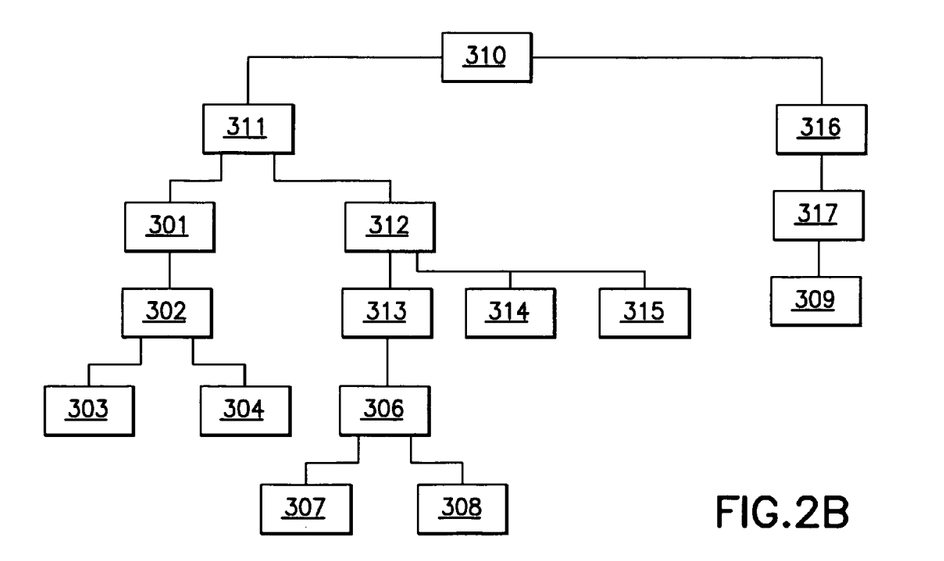

FIGS. 2A and 2B show an example of the reorganization of structured data for streaming, and should be viewed in conjunction with the following pseudo-code representations.

The following is a pseudo-code representation of conventional Structured Data with SVG Element Names (FIG. 2A):

```
<svg> (301)
  <g> (302)
    <path/> (303)
    <animateTransform/> (304)
    <image xlink:href= =www.example.foo/stockupdate.svg/> (305)
  </g>
```

-continued

```
    <g> (306)
        <rect/> (307)
        <animateTransform/> (308)
    </g>
    <ellipse/> (309)
</svg>
```

The following is a pseudo-code representation of Structured Data with Streaming Extensions in accordance with this invention (FIG. 2B):

```
<sml>(310)
    <scene>(311)
        <svg>(301)
            <g id="g1">(302)
                <path/>(303)
                <animateTransform/>(304)
            </g>
        </svg>
        <stream>(312)
            <addObject time="5s" anchor="g1" relation=
            "nextSibling">(313)
                <g id="g2">(306)
                    <rect/>(307)
                    <animateTransform/>(308)
                </g>
            </addObject>
            <deleteObject time="15s" target="g1">(314)
            <addObject time="1s" anchor="g1" relation="child"
            refreshRate="1s"
            refreshURL=www.example.foo/stockupdate.svg>(315)
            </addObject>
        </stream>
    </scene>
    <scene dur="25">(316)
        <svg>(317)
            <ellipse/>(309)
        </svg>
    </scene>
</sml>
```

Figure 3A:
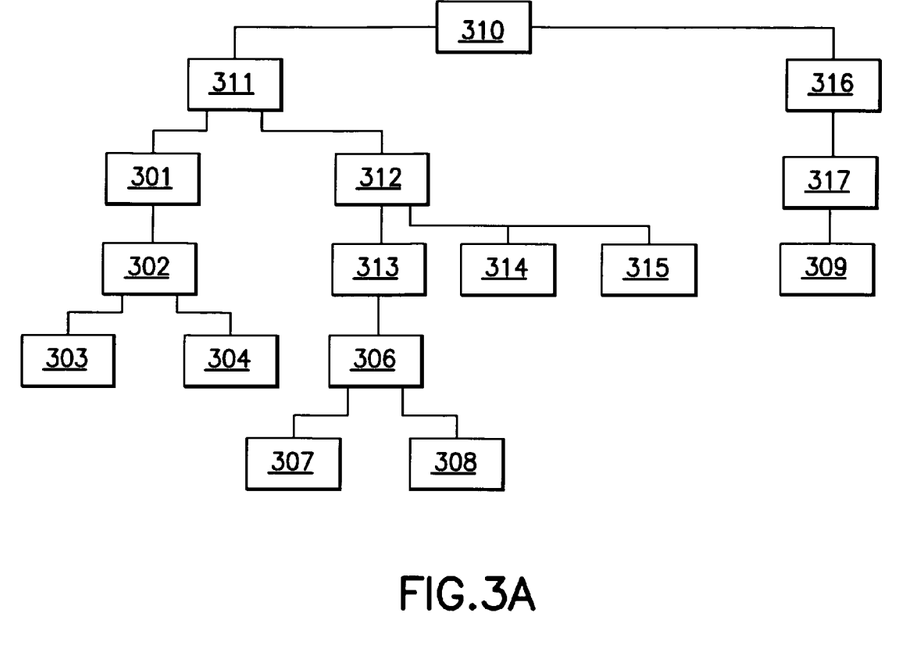
FIGS. 3A–3G illustrate a usage scenario that is one non-limiting example of the operation of the method and apparatus in accordance with this invention.
Figure 3B:
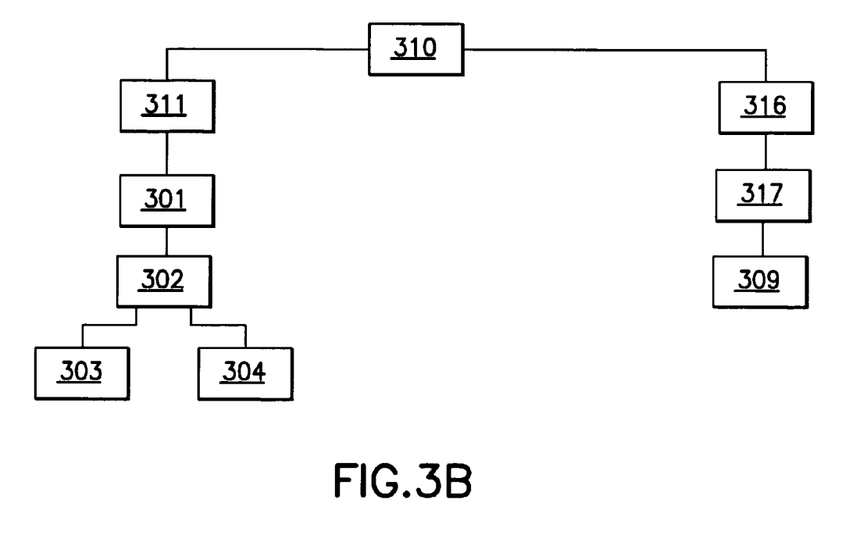
Figure 3C:
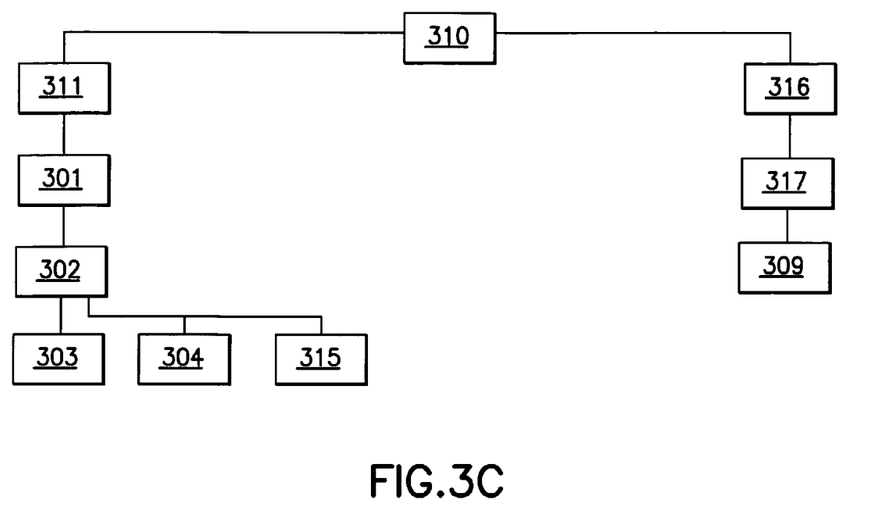
Figure 3D:
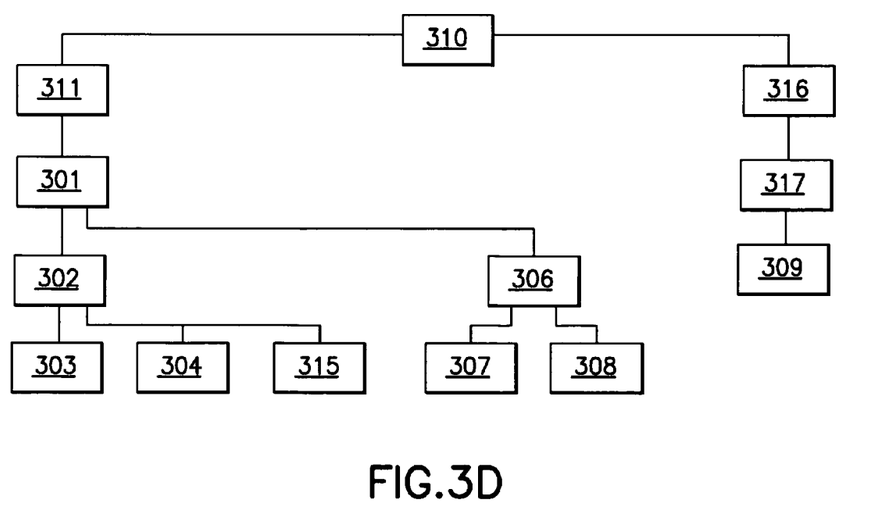
Figure 3E:
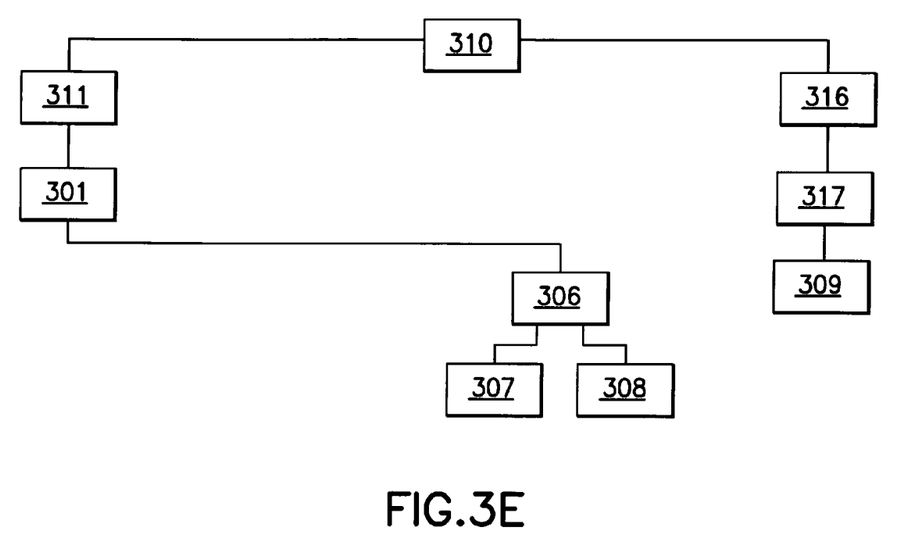
Figure 3F:
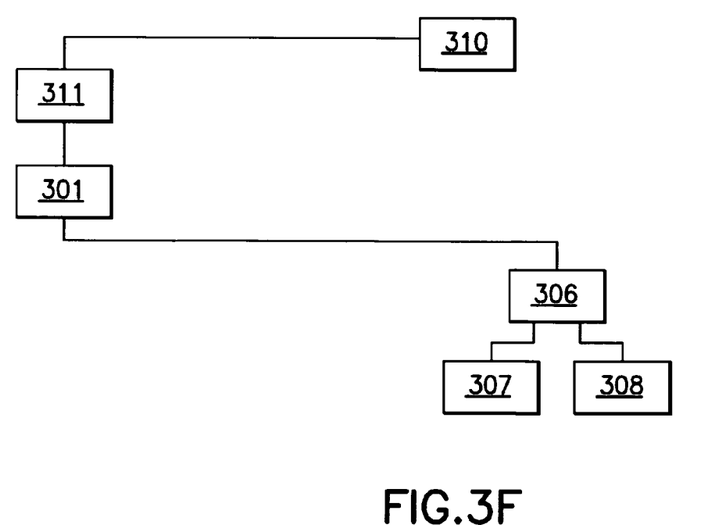
Figure 3G:
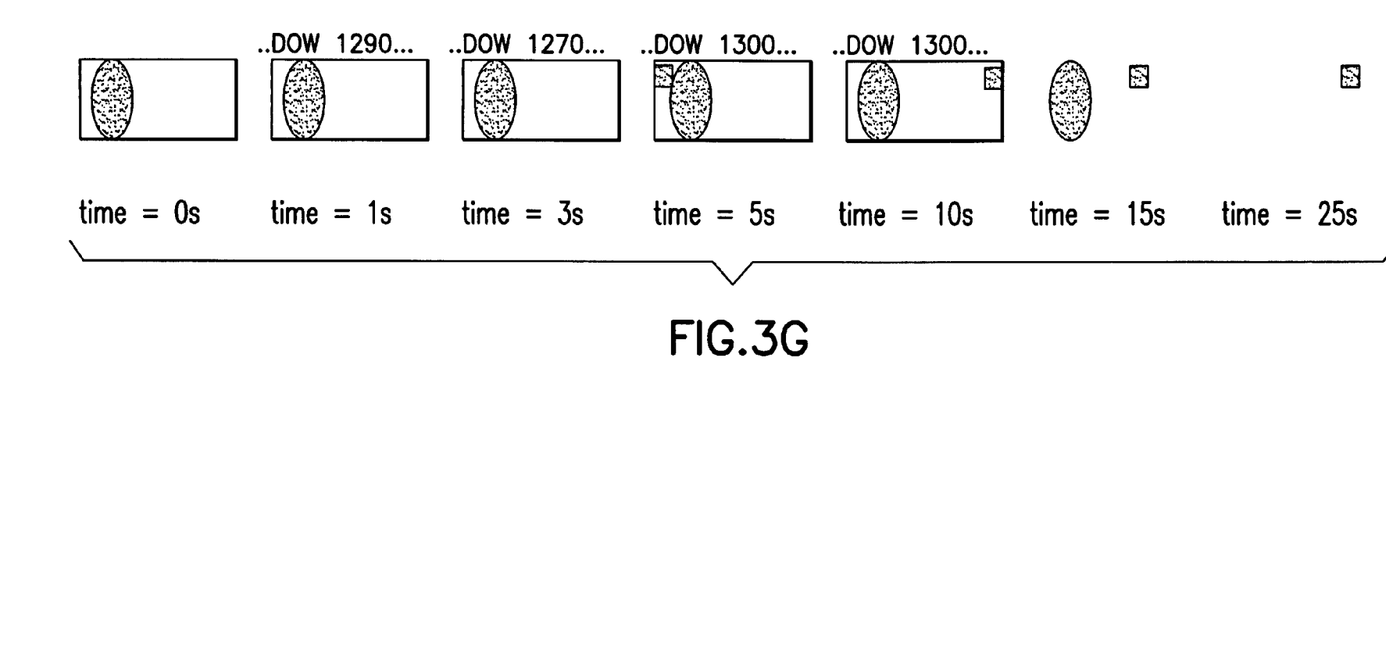

FIGS. 3A, 3B, 3C, 3D, 3E, 3F and 3G are an example of a usage scenario for the immediately preceding streaming pseudo-code embodiment, where FIG. 3A shows the content on the data transmitter (server) 1 at all times; FIG. 3B shows the content at the data receiver (client) 3 at time 0; FIG. 3C shows the content at the data receiver 3 at time 1 second, where the added element 315 is updated once per second; FIG. 3D shows the content at the data receiver 3 at time 5 seconds, with added elements 306, 307 and 308; FIG. 3E shows the content at the data receiver 3 at time 15 seconds, with deleted elements 302, 303, 304 and 315; and FIG. 3F shows the content at the data receiver 3 at time 25 seconds, with deleted elements 316, 317 and 309. FIG. 3G illustrates a series of "snapshots" taken at time values 0, 1 second, 3 seconds, 5 seconds, 10 seconds, 15 seconds and 25 seconds, and depicts the animation that the client or data receiver 3 renders on a display device in response to the receipt of the foregoing streaming pseudo-code through the network environment 2.

Figure 4:
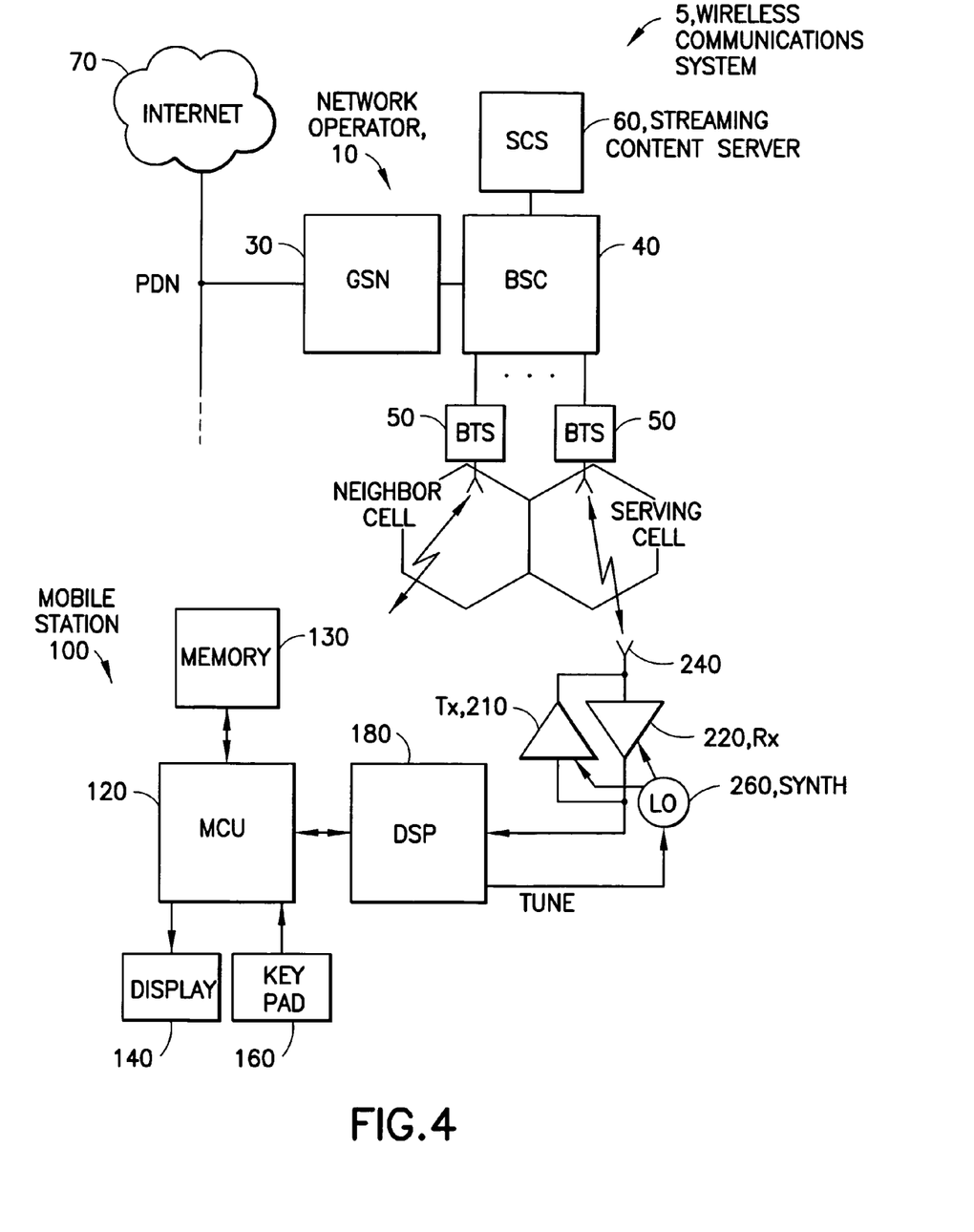
FIG. 4 is a simplified block diagram of an embodiment of this invention in a wireless network containing a network operator, a mobile station and a wireless (RF) link network environment.

FIG. 4 illustrates a simplified block diagram of an embodiment of a wireless communications system 5 that is suitable for practicing this invention. The wireless communications system 5 includes at least one mobile station (MS) 100. FIG. 4 also shows an exemplary network operator having, for example, a GPRS Support Node (GSN) 30 for connecting to a telecommunications network, such as a Public Packet Data Network or PDN, at least one base station controller (BSC) 40, and a plurality of base transceiver stations (BTS) 50 that transmit in a forward or downlink direction both physical and logical channels over a wireless link to the mobile station 100 in accordance with a predetermined air interface standard. A reverse or uplink communication path also exists from the mobile station 100 to the network operator, which conveys mobile originated access requests and traffic. The wireless link represents, for the purposes of this description, a limited bandwidth network connection, and corresponds in whole or in part to the network environment 2 shown in FIG. 4. In other embodiments of this invention the network environment 2 could be implemented through, as examples, a wire, or a cable, or an optical fiber, or through an optical wireless link (e.g., an infra-red link).

The air interface standard can conform to any suitable standard or protocol, and may enable both voice and data traffic, such as data traffic enabling Internet 70 access and downloads. As non-limiting examples, the air interface standard can be a Time Division Multiple Access (TDMA) air interface that supports a GSM or an advanced GSM protocol and air interface, or it may be a Code Division Multiple Access (CDMA) air interface standard.

The network operator includes or is coupled to a Streaming Content Server (SCS) 60 that transmits streaming content towards the mobile station 100, via the BSC 40 and BTS 50, which together may be considered to be equivalent to the data transmitter 1 shown in FIG. 1, while the mobile station 100 may be considered to be equivalent to the data receiver or client 3 of FIG. 1. The SCS 60 operates in accordance with the foregoing description of the presently preferred embodiments of this invention to stream structured data towards the mobile station 100, and the mobile station 100, as the client, is responsive to the received stream to decode same and render the graphical content, as was illustrated above in reference to the example shown in FIGS. 3B–3G.

The mobile station 100 typically includes a microcontrol unit (MCU) 120 having an output coupled to an input of a display 140 and an input coupled to an output of a keyboard or keypad 160. The mobile station 100 may be a handheld radiotelephone, such as a cellular telephone or a personal communicator. The mobile station 100 could also be contained within a card or module that is connected during use to another device. For example, the mobile station 10 could be contained within a PCMCIA or similar type of card or module that is installed during use within a portable data processor, such as a laptop or notebook computer, or even a computer that is wearable by the user.

The MCU 120 is assumed to include or be coupled to some type of a memory 130, including a read-only memory (ROM) for storing an operating program, as well as a random access memory (RAM) for temporarily storing required data, scratchpad memory, received packet data, packet data to be transmitted, and the like. A separate, removable SIM (not shown) can be provided as well, the SIM storing, for example, a preferred Public Land Mobile Network (PLMN) list and other subscriber-related information. The ROM is assumed, for the purposes of this invention, to store a program enabling the MCU 120 to execute the software routines, layers and protocols required to implement the data receiver 3 methods in accordance with these teachings, and may as well provide a suitable user interface (UI), via a display 140 and keypad 160, with a user. The result of the rendering of the decoded structured data stream can be displayed on the display 140, as was noted above in the discussion of FIG. 3G.

Although not shown, a microphone and speaker are typically provided for enabling the user to conduct voice calls in a conventional manner.

The mobile station 100 also contains a wireless section that includes a digital signal processor (DSP) 180, or equivalent high speed processor or logic, as well as a wireless transceiver that includes a transmitter 210 and a receiver 220, both of which are coupled to an antenna 240 for communication with the network operator. At least one local oscillator (LO) 260, such as a frequency synthesizer, is provided for tuning the transceiver. Data, such as digitized voice data, is transmitted and received through the antenna 240, and the structured data stream from the Streaming Content Server (SCS) 60 is also received through the antenna 240, and is thereafter processed by the DSP 180 and/or the MCU 120 to display the encoded animation or other video images to the user on the display 160.

In view of the foregoing description, it should be appreciated that this invention overcomes the problems that are inherent in the prior art approaches discussed previously. For example, and with regard to the streaming of non-structured video and audio data, these formats are suited for streaming only non-structured binary data, such as video and audio, and not structured data.

Figure 5A:
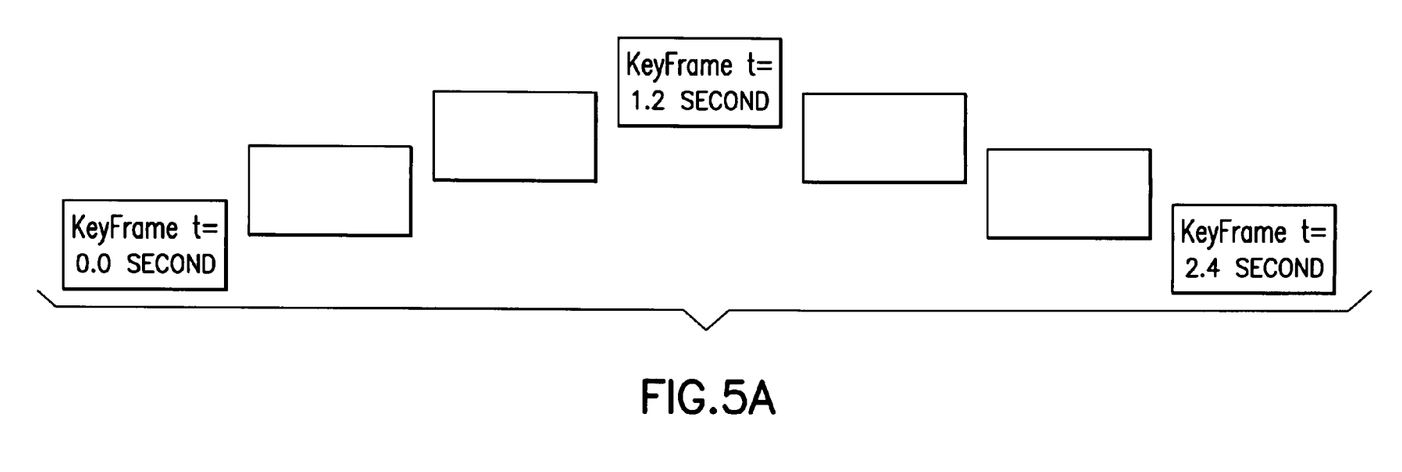
Figure 5B:
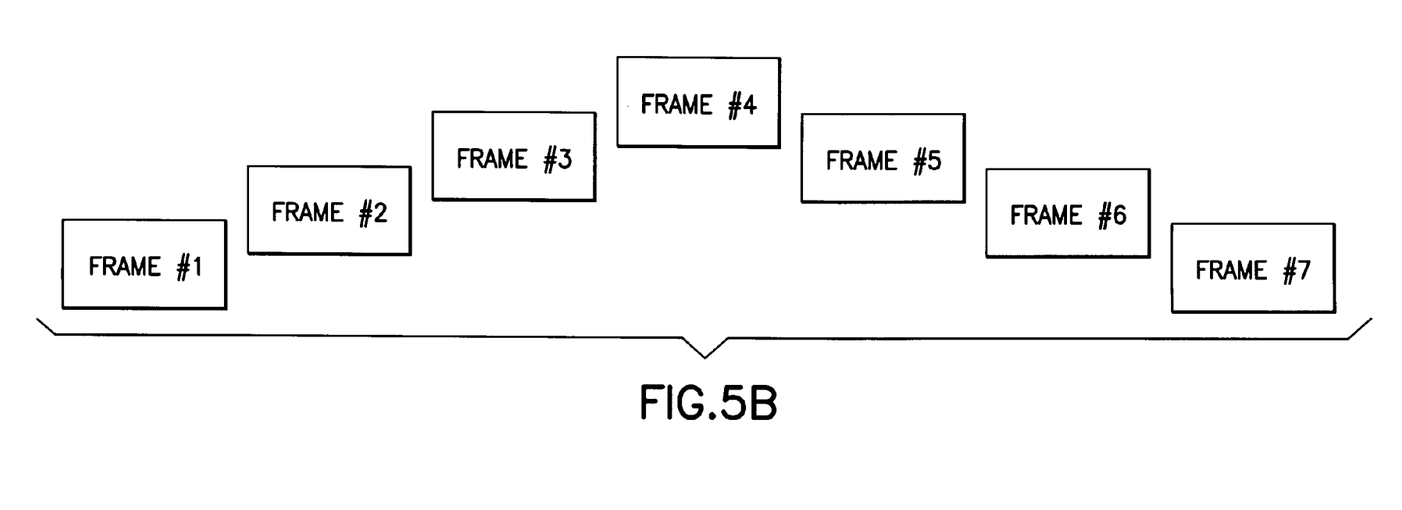
FIG. 5B illustrates an example of a streamed frame-based animation.

With regard to the Macromedia Flash™ technique, this approach uses a binary file format and cannot be used for generic structured data or XML. On the other hand, this invention enables the streaming of arbitrarily structured data. This invention can also be used to stream vector graphics using time-based animation. The example shown in FIG. 5 illustrates significant differences between streaming using time based animation versus the frame based approach. The boxes shown in FIG. 5A illustrate a streamed, time based animation content. The boxes of FIG. 5B illustrate a streamed, frame based animation. In this example, the frame-based approach requires streaming new coordinate values at each frame. On the other hand, time-based animation requires streaming only keyframes of the animation. The use of the teachings of this invention enables one to stream time-based animations, as well as any arbitrary time-based type of content.

The approach taken in U.S. Pat. No. 6,057,854 relies on the presence of a client-server based system, without considering any streaming capabilities.

The MPEG-7 BiM approach defines a compression and streaming method for structured data; but it does not define how the input data is partitioned into streamable subsets. This invention both addresses and solves this problem.

The approach taken in WO 01/26373 A2 aims to solve the problem of transmitting a large XML tree, by subdividing it into a set of independent subtrees, which are transmitted separately. However, it does not provide a solution that allows the content creator to control the division of the XML tree. This creates problems in some types of structured content, e.g., when using vector graphic representations, because it does not take into account the semantics of the content. This invention, to the contrary, allows the content creator to control how the content is divided.

The Push and Pull approach is not in and of itself a method to organize structured data, but instead represent a functionality of the HTML language and its transfer protocol HTTP. This invention solves a different problem than HTTP Push and Pull, as it enables the content creator to structure the data to be streamed.

The SMIL technique has two elements 'par' (parallel) and 'seq' (sequential) that handle the timing and execution of SMIL content. However, these two elements do not introduce or define a streaming functionality. Put another way, SMIL enables the simple authoring of interactive audiovisual presentations, and is typically used for rich media/multimedia presentations that integrate streaming audio and video with images, text or any other media type. In all these cases the actual streaming is file format dependent and not related to the functionality of SMIL per se.

As such, it should be appreciated that this invention provides significant advantages over the prior art techniques.

The teachings of this invention can be applied to a workstation of a graphical content developer, such as one that forms a part of, or that is coupled to, the SCS 60 of FIG. 4, or that is associated with the receiver 3. In accordance with this invention the content developer may divide a pre-existing or a new temporally-based structured data graphical presentation, such as an animation, into smaller temporally-based scenes each having some temporal extension. These scenes are not, per se, equivalent to the conventional use of frames. In fact, some number of conventional frames can be incorporated within a single scene, thereby reducing the amount of structured data content that must be transmitted, processed and stored. These teachings enable a large and complex graphical presentation, such as an animation, to be efficiently transmitted to and displayed by a relatively small device, such as a cellular telephone, a personal communicator or a personal digital assistant (PDA). These teachings can be applied to any time-based graphical presentation, and in the specific, non-limiting embodiment disclosed above these teachings are applied to and used to extend the capabilities of SVG.

Thus, while these teachings have been particularly shown and described with respect to preferred embodiments thereof, it will be understood by those skilled in the art that changes in form and details may be made therein without departing from the scope of this invention.

What is claimed is:

1. A method for sending structured data from a transmitter to a receiver through a network environment, comprising:
   partitioning the structured data into at least one scene by inserting scene delimiter statements, where each scene includes at least one object;
   within a scene, opening a stream by inserting a first stream delimiter command;
   within the stream, using at least one of an object addition, deletion and modification command;
   within the scene, closing the open stream by inserting a second stream delimiter command; and
   transmitting the resulting structured data through the network environment,
   where a plurality of scenes cover mutually exclusive time intervals.

2. A method as in claim 1, where a scene comprises an attribute that specifies a total duration of the scene, and overrides a total scene duration determined from elements that comprise the scene.

3. A method as in claim 1, where an object addition command references an object in a current graphics tree, and comprises attributes of anchor, relation and time.

4. A method as in claim 3, where the anchor attribute is a reference to an ID of an object in the current graphics tree and, with the relation attribute, specifies where in the current graphics tree an associated object should be inserted, and where the time attribute specifies the time when the object insertion is to be performed.

5. A method as in claim 1, where an object deletion command references an object in a current graphics tree, and comprises attributes of anchor and time.

6. A method as in claim 5, where the anchor attribute is a reference to an ID of an object in the current graphics tree that is to be removed from the current graphics tree, and where the time attribute specifies the time when the object removal is to be performed.

7. A method as in claim 1, where an object modification command comprises a refresh time interval when the associated object is to be updated with a new object downloaded from a link refresh network address.

8. A method as in claim 1, where a union of the time intervals comprises a continuous time interval.

9. A method as in claim 1, where the structured data comprises Extensible Markup Language (XML) data.

10. A method as in claim 9, where the XML data comprises Scalable Graphics Format (SVG) data.

11. Apparatus for sending structured data from a transmitter to a receiver through a network environment, comprising transmit stream modeling language (SML) means for partitioning the structured data into at least one scene by inserting scene delimiter statements, where each scene includes at least one object, where within a scene said SML means opens a stream by inserting a first stream delimiter command; where within the stream said SML means uses at least one of an object addition, deletion and modification command and closes the open stream by inserting a second stream delimiter command; and means for transmitting the resulting structured data through said network environment to a receiver SML means, where a plurality of scenes cover mutually exclusive time intervals.

12. Apparatus as in claim 11, where a scene comprises an attribute that specifies a total duration of the scene, and overrides a total scene duration determined from elements that comprise the scene.

13. Apparatus as in claim 11, where an object addition command references an object in a current graphics tree, and comprises attributes of anchor, relation and time.

14. Apparatus as in claim 13, where the anchor attribute is a reference to an ID of an object in the current graphics tree and, with the relation attribute, specifies where in the current graphics tree an associated object should be inserted, and where the time attribute specifies the time when the object insertion is to be performed.

15. Apparatus as in claim 11, where an object deletion command references an object in a current graphics tree, and comprises attributes of anchor and time.

16. Apparatus as in claim 15, where the anchor attribute is a reference to an ID of an object in the current graphics tree that is to be removed from the current graphics tree, and where the time attribute specifies the time when the object removal is to be performed.

17. Apparatus as in claim 11, where an object modification command comprises a refresh time interval when the associated object is to be updated with a new object downloaded from a link refresh network address.

18. Apparatus as in claim 11, where a union of the time intervals comprises a continuous time interval.

19. Apparatus as in claim 11, where the structured data comprises Extensible Markup Language (XML) data.

20. Apparatus as in claim 19, where the XML data comprises Scalable Graphics Format (SVG) data.

21. Apparatus as in claim 11, where the network environment comprises a wireless link.

22. Apparatus as in claim 11, where the network environment comprises an RF link between a network operator and a mobile station, and where the data receiver comprises the mobile station.

23. Apparatus for sending structured data from a transmitter to a receiver through a network environment, comprising transmit stream modeling language (SML) means for partitioning the structured data into at least one scene by inserting scene delimiter statements, where each scene includes at least one object, where within a scene said SML means opens a stream by inserting a first stream delimiter command; where within the stream said SML means uses at least one of an object addition, deletion and modification command and closes the open stream by inserting a second stream delimiter command; and means for transmitting the resulting structured data through said network environment to a receiver SML means, where the network environment comprises an RF link between a network operator and a mobile station, where the data receiver comprises the mobile station and where said mobile station comprises a display for displaying a result of processing of said SML data by said receiver SML means.

24. A mobile station comprising a receiver and at least one data processor coupled to an output of the receiver, said data processor operating under control of a stored program for inputting and interpreting commands contained in received structured data, said data processor being responsive to a presence of a scene delimited by scene commands, where each scene includes at least one object and where a plurality of scenes encompass mutually exclusive time intervals, for receiving a stream delimited by stream commands and within the received stream, for responding to at least one of an object addition, deletion and modification command for rendering a graphical presentation on a display device.

25. A mobile station as in claim 24, where a scene comprises an attribute that specifies a total duration of the scene, and overrides a total scene duration determined from elements that comprise the scene.

26. A mobile station as in claim 24, where an object addition command references an object in a current graphics tree, and comprises attributes of anchor, relation and time, where the anchor attribute is a reference to an ID of an object in the current graphics tree and, with the relation attribute, specifies where in the current graphics tree an associated object should be inserted, and where the time attribute specifies the time when the object insertion is to be performed, where an object deletion command references an object in the current graphics tree, and comprises attributes of anchor and time, where the anchor attribute is a reference to an ID of an object in the current graphics tree that is to be removed from the current graphics tree, and where the time attribute specifies the time when the object removal is to be performed, where an object modification command comprises a refresh time interval when the associated object is to be updated with a new object downloaded from a link refresh network address.

27. A mobile station as in claim 24, where the structured data comprises Extensible Markup Language (XML) data.

28. A mobile station as in claim 27, where the XML data comprises Scalable Graphics Format (SVG) data.

* * * * *